Sept. 21, 1965         D. S. RIDLER         3,208,047
                  DATA PROCESSING EQUIPMENT
Filed March 30, 1960                    4 Sheets-Sheet 1

Inventor
D.S. Ridler
By Robert Harding Jr.
       Attorney

Sept. 21, 1965  D. S. RIDLER  3,208,047
DATA PROCESSING EQUIPMENT
Filed March 30, 1960  4 Sheets-Sheet 4

FIG.5.

Inventor
D.S. Ridler

By
Attorney

3,208,047
DATA PROCESSING EQUIPMENT
Desmond Sydney Ridler, London, England, assignor to International Standard Electric Corporation, New York, N.Y.
Filed Mar. 30, 1960, Ser. No. 18,678
Claims priority, application Great Britain, Apr. 8, 1959, 11,822/59
6 Claims. (Cl. 340—172.5)

The present invention relates to data processing equipment and to telecommunication equipment in which electrical operations are performed under control of stored programmes.

With a large switching system such as an electronic telephone or telegraph exchange, or with complex data processing systems, the amount of equipment needed is very large if conventional control techniques based on electro-mechanical practice are used. To overcome this disadvantage methods have been developed of using stored programmes, which consist of fixed electrical orders capable of application as required to various groups of electrical equipment, according to the particular electrical operations to be performed by these groups. This invention relates to an improved method of using these stored programmes. In the description which follows, and in the claims, these groups of electrical equipment are referred to for convenience as "functional blocks."

According to the invention therefore there is provided an electrical system for the control of inter-related electrical operations by means of information which can be extracted from a main store of information, wherein part of the information so extracted is stored in an auxiliary temporary store for subsequent use in directing a further extraction of information which is at least partially dependent upon the previously extracted information.

Also according to the invention there is provided an electrical system for the control of inter-related electrical operations to be performed by a plurality of functional blocks, a main storage assembly for storing instruction programmes by which the said control is applied, an auxiliary temporary store divided into sections each of which is allocated to a functional block, switching means for sequentially coupling each functional block in turn to any desired instruction item in the permanent store according to an address comprising a first part derived from the current input condition of the functional block and a second part derived from reading destructively the current information in the allocated section of the auxiliary store, the entire address being used to select the desired instruction item from the permanent store, and means for applying a part of said instruction item to the functional block as an output signal and for writing another part into the allocated section of the temporary store, so that the required electrical operation is performed by the functional block and information is left in the temporary store for subsequent use by the functional block.

It should be appreciated that, although the arrangements described herein are particularly suited to telecommunication systems, they are not restricted to such systems.

Two embodiments of the invention will now be described with reference to the accompanying drawings in which.

GENERAL DESCRIPTION

The arrangement of a system using stored programmes includes a main store, for example, a photographic store with optical reading arrangements, holding a number of sets of signal conditions representing code words, each of which represents one instruction of the stored programme and each of which may be selected in response to the application of signals, representing its address in the main store, to suitably arranged switching elements. In addition there is an auxiliary temporary store, such as a co-ordinate magnetic matrix memory, having a section allocated to each one of $x$ functional blocks. The system is controlled by timed pulses which define a repetitive time cycle having $x$ time positions, one per functional block, and each functional block has access to both the main and auxiliary stores during its portion of the cycle.

When the $n$th block is given access at its time position in the cycle to the stores, two operations occur. The first of these is that the inputs to the block, which represent its condition at that time, are sampled, and these are applied to the selecting elements controlling the permanent store as a partial address. The second of these operations is that the information recorded in the $n$th block's portion of the auxiliary store is read destructively from that store and applied to the selecting elements as a further partial address. This information relates to the current state of the logic of the system with respect to the $n$th block, and was obtained for the temporary store during the same block's time position in the preceding cycle. That is, it indicates the last performed operation in a sequence of operations being performed for that functional block.

Thus it will be seen that two partial addresses are applied to the main store selecting elements, and these partial addresses together define the position of an instruction word in the main store. This word is then read non-destructively from the store. One part of this word, the instruction proper, is applied to the $n$th block, where it serves as the output therefrom. This output causes any necessary operation to be performed. The instruction word extracted from the main store also includes a second part, which is a partial address. This is recorded in the portion of the temporary store allotted to the $n$th block, and serves as a partial address for the main store during the same block's time position in the next cycle.

In a large system, it may be necessary to produce the main store address from the two partial addresses described above, together with a further number defining the programme sub-routine to be used. In this case the address is assembled, in accordance with the operations to be performed, from three partial addresses, one of which defines one of a number of stored sub-routines while the other two together define an address within that sub-routine.

An extension of the arrangement described above is to use two or more, preferably adjacent, time positions in the cycle for each functional block served, so that the complexity of the system logic can be increased. In this case an extra store, known as the transfer store, is provided for transferring information between the same block's time positions. This arrangement will be further described in connection with the second embodiment.

Where an arrangement such as has been described is used in a telecommunication switching system, it is convenient to be able to modify information to which access was obtained several time positions back under control of the outputs from the main store. This can readily be effected where the auxiliary store is a co-ordinate matrix memory by the provision of a second set of selecting elements therefor, or by the provision of additional control circuits, for the existing selecting elements. With other forms of auxiliary storage suitable control arrangements can be provided to enable this modification to be effected.

From the preceding discussion of arrangements according to the invention it will be seen that the basis is that each word transferred from the main store supplies an instruction to be used immediately in respect of the purpose for which it was transferred, and also supplies part of the address of the next instruction word relating to the associated functional block so that when the same block has access to the stores during the next cycle, the address, part of which was supplied from the main store during the preceding cycle, is completed in a manner dependent on the then condition of that block. This address, either alone or with a further partial address, then determine the selection of the next instruction from the main store.

The following description of the two embodiments gives examples of the application of the arrangements described above to some functional operations which are encountered in data processing and telecommunication practice. Two examples are quite elementary and use the first embodiment, while the others are somewhat more complex and use the further facilities given by the second embodiment.

Figure 1:
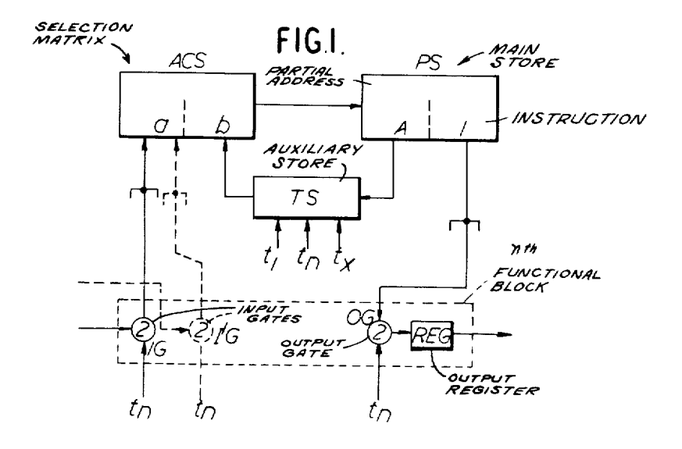
FIG. 1 is a block diagram of the first embodiment of the invention.

FIRST EMBODIMENT (FIG. 1)

This schematically shows, enclosed in a broken-line rectangle, as much as is necessary for an understanding of the invention in relation to the $n$th functional block served by the equipment. Also schematically shown are the main store PS, which is a permanent store in which the instruction words which form the programme are each stored at different locations. This store can, as indicated above, be a photographic store in which the information is recorded on photographic plates, with an electro-optical reading arrangement, or it could be a ferro-magnetic matrix store with non-destructive read-out. As already described above, each word which is recorded in PS includes a partial address portion and an instruction portion. This is indicated schematically in FIG. 1 by the respective reference characters A and I in the two portions of the store PS. Store PS is served by a matrix of selecting elements designated ACS, of well-known type, for example a matrix of diode gates controlled by arrays of bistable devices as in the exemplary illustration, afforded by FIGURE 13–16, on page 324 of "the design of switching circuits," W. Keister, A. E. Ritchie, and S. H. Washburn; a book published by D. Van Nostrand Company. Each address selection is performed in response to the application to selecting matrix ACS of two partial addresses, as indicated in FIG. 1 by, to the two portions $a$ and $b$ thereof. Finally, the equipment includes the auxiliary temporary store TS, which is preferably a co-ordinate matrix of magnetic memory elements of well-known type.

As shown in FIG. 1, the $n$th functional block includes an input gate IG, and an output gate OG, both opened at its time position $t_n$, and also a register REG (e.g. a bistable device) associated with the output gate OG.

When the $n$th time position in the cycle occurs, both IG and OG are opened, and the results of the sampling of the function block inputs are applied to matrix ACS as the partial address for section $a$ thereof. At the same time the information recorded in the row of the auxiliary store allotted to the $n$th block is read therefrom and applied to the $b$ section of matrix ACS. It will be recalled that the $a$ partial address is conditioned by the current state of the function block's input while the $b$ partial address is conditioned by the operation performed in respect of the same block during the preceding cycle. The complete address so produced defines the location of a word in the permanent store PS, and this word is therefore read from PS. Part of this word, the instruction part, is applied to the $n$th block, where it passes via the output gate OG to the register REG. This serves to control any necessary operation to be performed thereat. This operation can be performed at a speed which is relatively slow compared with the speed at which the equipment shown in FIG. 1 functions. The second part of this word, the address portion, is passed to the temporary store where it is recorded in the $n$th function block's portion thereof.

A similar sequence is repeated during subsequent time positions in the cycle.

Figure 2:
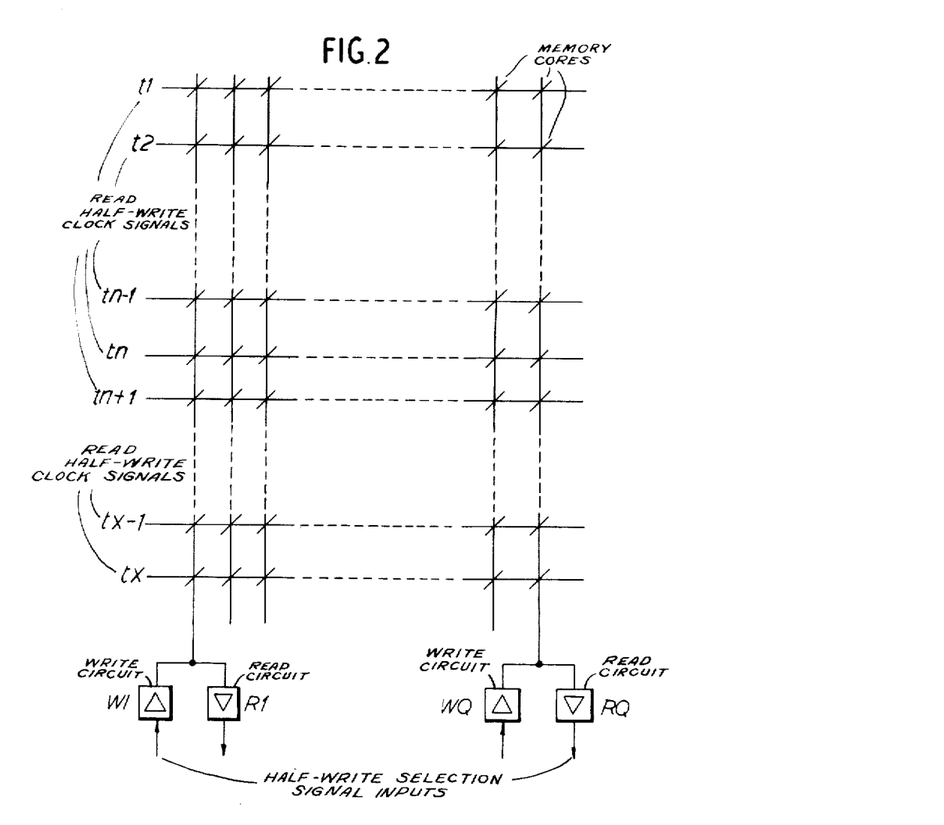
FIG. 2 is a temporary store suitable for use in the arrangement of FIG. 1, or FIG. 4.
Figure 3:
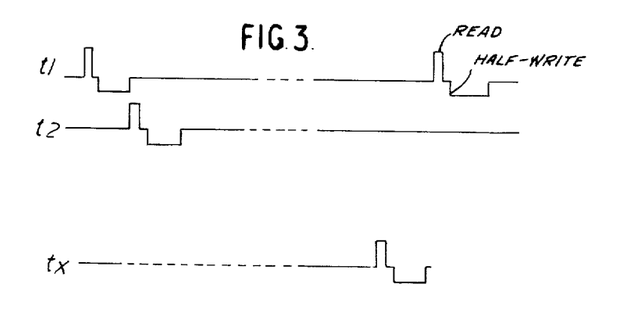
FIG. 3 shows certain waveforms present in the store of FIG. 2.

FIG. 2 shows diagrammatically a ferro-magnetic matrix memory of the so-called direct access type, in which each of $x$ function blocks is allocated a row of memory elements, each element being shown symbolically as a short diagonal line. Also shown schematically are the writing and reading circuits W1 to WQ and R1 to RQ for this matrix. FIG. 3 shows the read-half-write pulse signals used for controlling the array of FIG. 2. These are generated in well-known manner, each pulse combination including a read pulse followed after a pause by a half-write pulse. The read pulse is of such a size and in such a direction as to set all elements to which it is applied to 0, so that when such a pulse is applied to the row wire of a row of elements, the information stored therein is read out as pulses on the column wires which thread elements set from 1 to 0 by the read pulse and little or no pulses on the other column wires. The pause following the read pulse is of sufficient duration for switching operations in the associated equipment to be performed, and is followed by the half write pulse. This is in the direction for setting an element to 1 but of half the amplitude necessary therefor. At the same time as this half-write pulse is present, half write pulses are applied to the column wires of elements to be set to 1. This operation is well-known, and so no further description thereof is considered to be necessary.

*Example 1.—Binary adder*

It is now necessary to consider the programmes necessary so that such an arrangement can be used to perform logical operations, and relatively elementary examples will be considered. One example is where the $n$th block is required to act as a binary serial adder. An example of this adding operation is shown below:

```
  1101010
  1011100
 11000110
```

The adding process is to pair the digits, lowest denomination first, and to write the answer according to the following table.

| First Digit | | Second Digit | | Carry | | Result |
|---|---|---|---|---|---|---|
| 0 | + | 0 | + | 0 | = | 0 carry 0 |
| 0 | + | 1 | + | 0 | = | 1 carry 0 |
| 1 | + | 0 | + | 0 | = | 1 carry 0 |
| 1 | + | 1 | + | 0 | = | 0 carry 1 |
| 1 | + | 0 | + | 1 | = | 0 carry 1 |
| 0 | + | 1 | + | 1 | = | 0 carry 1 |
| 1 | + | 1 | + | 1 | = | 1 carry 1 |

Assume that the two numbers are applied serially in proper phase relation to two separate inputs to the $n$th function block, the digit repetition rate being of the same periodicity as the $n$th block sampling pulses, then the above table can be expressed as the following programme:

ADDER PROGRAMME

| Sampled Input To Function Block | | Address to Permanent Store Selection Matrix | | Programme in Permanent Store | |
|---|---|---|---|---|---|
| First Input | Second Input | Part A | Part B | Next Partial Address | Instruction |
| 0 | 0 | 0  0 | 0 | 0 | 0 |
| 0 | 1 | 0  1 | 0 | 0 | 1 |
| 1 | 0 | 1  0 | 0 | 0 | 1 |
| 1 | 1 | 1  1 | 0 | 1 | 0 |
| 1 | 0 | 1  0 | 1 | 1 | 0 |
| 0 | 1 | 0  1 | 1 | 1 | 0 |
| 1 | 1 | 1  1 | 1 | 1 | 1 |
| 0 | 0 | 0  0 | 1 | 0 | 1 |

This programme is simply the previous table slightly re-arranged and with the headings changed.

To consider the operations which occur in the system it is necessary to assume that the function block has two inputs, that via I′G and the additional input IG shown in broken lines in FIG. 1, the two numbers to be added, 1011100 and 1101010, being fed to these two inputs synchronously with the least significant digit leading.

The first imput sampling produces the partial address 00, and with 0 stored in the temporary store, a full address of 000 is applied to the permanent store selection matrix. The equipment includes means (not shown) which resets the part B portion of the address to 0 when an operation has been completed. The result of the information which is obtained from the permanent store in response to the address 000 is to send 0 as an instruction to the block output and 0 to the temporary store. That is, the information stored at address 000 to 00. The 0 sent to the output "tells" the function block that the result of adding the two digits presented to its input is 0, while the 0 sent to the temporary store acts as a recording of the carry.

The second input and temporary store sampling gives a permanent store selection matrix address of 010, which sends 1 to the function block, but again causes 0 to be stored in the temporary store since there is no carry. In this instance, the partial address information stored at address 010 is 0, while the instruction intelligence at the address is 1.

On the third sampling the complete address is 100, which gives the same result as the second complete address.

The fourth sampling finds both inputs at 1, so that the complete address is 110; the information extracted from the permanent store as a result of this causes 0 to be sent to the function block output, and 1 to the temporary store since there is a 1 to carry.

The fifth sampling produces a complete address of 101, which again produces carry and sends 0 to the function block.

The sixth sampling gives a complete address of 011 and this also gives carry and sends 0 to the function block.

On the seventh sampling the inputs are both at 1 and 1 (carry) is stored in the temporary store, so that the complete permanent store address is 111. The information extracted as a result of this causes 1 to be recorded for the next partial address—i.e. there is 1 to carry, and also causes 1 to be sent to the function block output.

Finally the eighth sampling finds the inputs at 00 with a carry so that the complete address is 001, giving an instruction of 1 and a next partial address of 0.

Thus the function block responds to the two trains of pulses representing the binary numbers and sends the sum of the two from its output in accordance with the rules stored as a programme in the permanent store. The programme is, of course, good for any pair of serial binary numbers.

This simple programme needs eight words of permanent information, each of three bits, while only one bit of temporary storage is needed. The same programme can be used by other function blocks which act as adders, using the common stores at different times. A further point to note is that the same information can appear at different addresses of the permanent store. Thus addresses 001, 010 and 100 all give the information 01, i.e. an instruction of 1 and a next partial address of 0, while addresses 110, 101 and 011 all give the information 10, i.e. an instruction of 0 and a next partial address of 1.

In a large system the address would be preceded by an additional binary number which would, in effect, define the position of the adder "sub-routine" in the permanent store.

*Example 2.—Decade counter*

The adder programme illustrates an advantage of programmed logic, which is that the design of the logical circuit is simplified because programming is largely a matter of listing the operational requirements. A programme which is more useful in communication systems than the adder programme is one for a counter. For the purpose of explanation it will be assumed that the $n$th function block is to act as a decade ring counter or distributor, having one input terminal on which pulses are received in phase with the $t_n$ sampling pulses, but otherwise random, and ten output terminals over which these random pulses are to be distributed. The next table shows a programme which satisfies these conditions.

DECADE COUNTER PROGRAMME

| Input to Function Block | | Address | | Programme | |
|---|---|---|---|---|---|
| | | Part A | Part B | Next Address | Instruction |
| (1) | 0 | 0 . 0000 | | 0000 . | |
| | 1 | 1 . 0000 | | 0001 . | 1000000000 |
| | 0 | 0 . 0001 | | 0001 . | |
| | 1 | 1 . 0001 | | 0010 . | 0100000000 |
| (5) | 0 | 0 . 0010 | | 0010 . | |
| | 1 | 1 . 0010 | | 0011 . | 0010000000 |
| | 0 | 0 . 0011 | | 0011 . | |
| | 1 | 1 . 0011 | | 0100 . | 0001000000 |
| | 0 | 0 . 0100 | | 0100 . | |
| 10 | 1 | 1 . 0100 | | 0101 . | 0000100000 |
| 20 | 1 | 1 . 1001 | | 0000 . | 0000000001 |

The initial condition in this case is with the temporary store holding 0000 as part B of the address. In this case as long as no pulses are being received, the permanent store is addressed 0.0000 on each sampling, so that in each case 0000 is re-stored in the temporary store and no instruction sent to the function block. When the first pulse on the input occurs, however, the address becomes 1.0000, causing a pulse to be sent to the first output, and a different partial address—0001—to be stored in the temporary store. In the absence of subsequent pulses the store is successively addressed 0.0001, which causes 0001 to be re-stored and no instruction sent to the function block. The second pulse causes the address to become 1.0001, and the instruction sent from this address to the function block causes a pulse to be sent to the second terminal, and 0010—the new partial address—to be sent to the temporary store. As can be seen from the table, subsequent randomly—received pulses are distributed sequentially over the output terminals under control of the programme.

In this case the stored partial address contains more bits than the input, which complicates the appearance of the programme. This can be more conveniently written using alphabetical symbols instead of binary numbers, as in the next table.

DECADE COUNTER PROGRAMME

| Input of Function Block | | Permanent Store Address | Programme |
|---|---|---|---|
| 1. | 1. | 0 | 0.aa ← | aa. |
|    |    | 0 | 1.aa | ab. 1000000000 |
| 2. | 1. |   | 0.ab | ab. |
|    |    | 0 | 1.ab | ac. 0100000000 |
| 3. | 1. |   | 0.ac | ac. |
|    |    | 0 | 1.ac | ad. 0010000000 |
|    |    |   | 0.ad | ad. |
| 9. | 1. |   | 1.ai | aj. 0000000010 |
|    |    | 0 | 0.aj | aj. |
|    | 1. |   | 1.aj | ──── aa. 0000000001 |

In the written programme, it will further be noted that each number of the partial address obtained from the permanent store is preceded by the number $a$, which distinguishes the decade ring counter programme from other programmes using the same binary numbers 0000, 0001, etc. In effect a counter sub-routine has been produced which can be part of a more complex programme, so that it can be used in common by function blocks with different overall programmes. A further point to be noted is that this counter sub-routine is closed on itself, i.e. the last instruction at address $1.aj$ gives as the next partial address $aa$, which returns the operations to the start.

Figure 4:
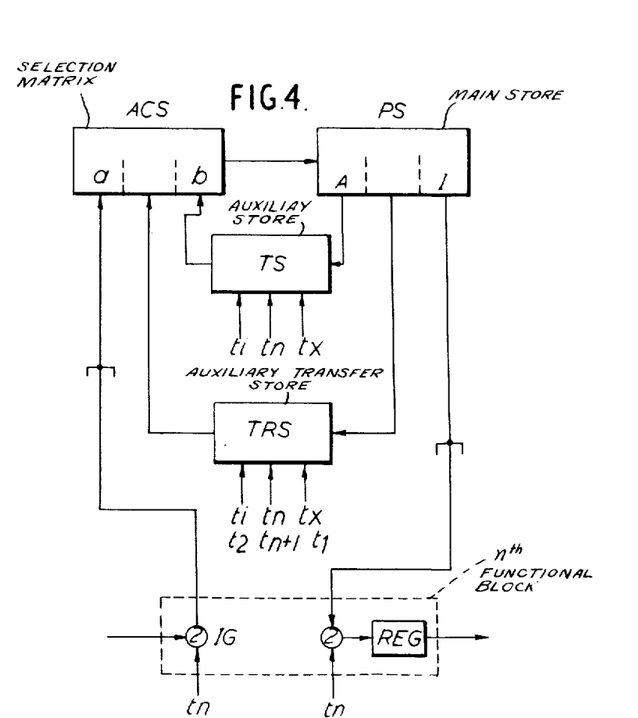
FIG. 4 shows a second embodiment of the invention.

SECOND EMBODIMENT (FIG. 4)

Figure 5:
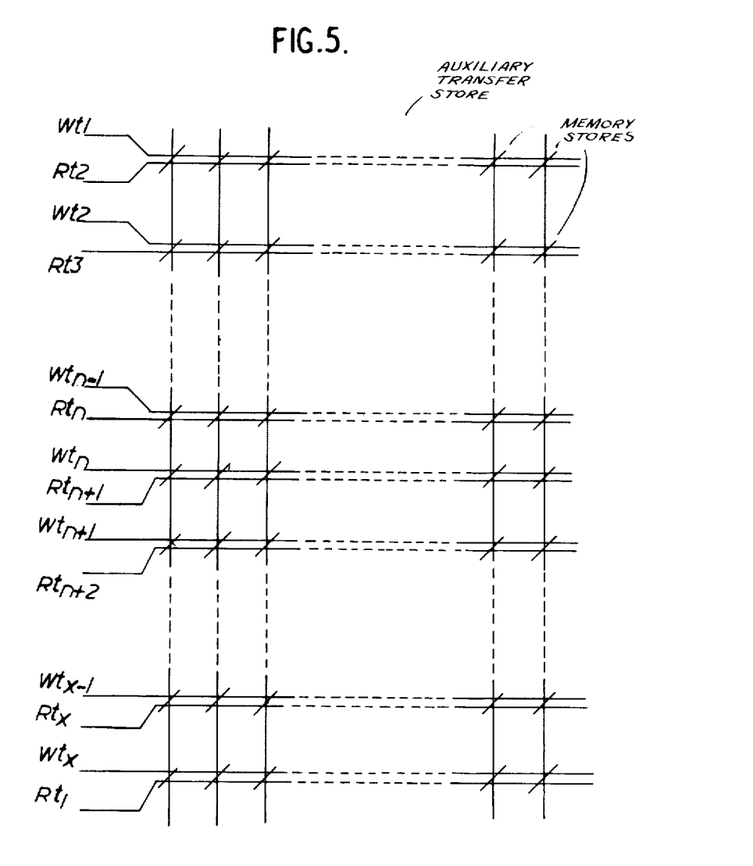
FIG. 5 is the transfer store used in the arrangement of FIG. 4.

There is a practical limit to the complexity of logical operations which can be achieved within one time position without an excessive increase of the word length, and this can be overcome by using two or more, preferably adjacent time positions for one function block. This arrangement is shown in the second embodiment, FIG. 4. It now becomes necessary to provide a transfer store, shown in FIG. 4, at TRS, to convey information between the time positions for the same function block. This is a temporary store similar to the store TS, and like that can be a co-ordinate ferro-magnetic matrix store of the so-called direct-access type. An example of such a transfer store is shown in FIG. 5, in which the reading and writing column circuits are omitted. This store has two row wires for each row of elements, writing in a row and reading from the row occurring at different time positions. Thus in FIG. 4 it will be seen that a row is written in at $t_n$ and read from at $t_{n+1}$. This applies where two adjacent time positions are allotted to the same function block.

To show the use of the transfer store, and the more complex logical operation which can thereby be achieved, an example will be described. This is a scale-of-1000 counter using the decade sub-routine three times over in adjacent time slots.

*Example 1.—Scale-of-1000 counter*

For the decade counting programme the units counting occurs in the first of the three time positions $t_n$ allocated to the block for which the counter routine is to be used. The programme in the permanent store only differs from that used for the distribution in one respect. This is that the instruction portion only consists of one bit, which is either 0 or 1, and is only 1 for every tenth pulse. Hence each pulse which is dealt with causes a different next partial address to be written into the temporary store at time $t_n$, and all pulses except the tenth cause an instruction 0 to be written in the transfer store. Each tenth pulse causes an instruction 1 to be written into the transfer store at $t_n$.

The second time position is used to deal with the tens count, and it does so under control of intelligence read from the transfer store at $t_{n+1}$. Hence in this case each permanent store address has three portions, the input information, 0 for no pulse and 1 for pulse, the appropriate next partial address, one of $aa$ to $aj$, and also information from the preceding time position via the transfer store. This latter is normally 0, but will be 1 for every tenth pulse. While pulses 1 to 9, 11–19, etc. are being counted, there is no action at $t_{n+1}$, so that the complete address includes 0 0 followed by the appropriate two letter combination (i.e. one of $aa$ to $aj$). Each time this is read at $t_{n+1}$, therefore, it is re-recorded and no action taken. However, on each tenth pulse the presence of a 1 due to the address reading of the transfer store at $t_{n+1}$ causes the input to be sampled. Hence the complete address becomes 11 followed by the appropriate two-letter combination—the appropriate one of $aa$ to $aj$ as in the case of the units. Here also the result of such an address is to extract from the store a new partial address, i.e. for the first tens pulse to be dealt with $aa$ is replaced by $ab$, plus an instruction digit to be inserted at $t_{n+1}$ in the transfer store. This instruction digit is 0 for the tenth, twentieth, . . . ninetieth pulses, but is 1 for the hundredth pulse.

At $t_{n+2}$, the time position for the hundreds count, operations occur in a similar manner under the control of information brought forward from $t_{n+1}$ to $t_{n+2}$ via the transfer store. In this case the instruction digit is 0 or 1 as before, but when it is 0 no output is sent to the function block, while when it is 1, an output is sent to the function block. Hence the latter gives an output pulse once for every thousand input pulses.

Thus here we have the same sub-routine, the decade count using partial addresses $aa$ to $aj$, used three times over in slightly different ways to give an overall result. The programme requires 20 words of permanent storage, these being the ten combinations $aa$ to $aj$, each with a 1 or a 0 as an instruction, this being transferred forward for a block's first two time positions and effective on the block in the third time position, three words of partial address temporary storage, and two bits of transfer storage.

In view of the full explanation given of the single use of the decade counter programme and the detailed indications of its modification for use as a divide-by-1000 counter, it is thought that the detailed programme therefore need not be included.

It is now possible to consider the use of such a programme in telephone and telegraph equipment. For convenience of circuit design, however, it is desirable to be able to modify information several time positions back under the control of the permanent store. This can readily be achieved by the use of an additional access switch which can be controlled when necessary to response to the permanent store output. This facility is not essential, but its use considerably simplifies the programming. It is however not included in the following description or in the drawings.

*Example 2.—Dial pulse receiver and counter*

A dial pulse receiver and counter is a device which will recognize and count impulses originating from a subscriber's dial at a rate around ten per second, and will recognise an interdigital pulse and reset the count in response to the recognition thereof. This programme is given below and uses four time positions. It will give correct operation as long as neither the make nor the break time of the dial is less than 10 millisecs. It will respond to an interdigital pause of 120–130 secs.

The first two time positions, $t_n$ and $t_{n+1}$, are used to generate pulses occurring at 10 millisecs intervals to control the times at which the condition of the line is examined. The decade counter route is used twice over to give the scale-of-100 count, the basic time position interval being 100 microsecs, i.e. a p.r.f. of 100 kc./s.

These two time positions between them produce pulses occurring at intervals of 10 millisecs. for the functional block served at $t_n$ and $t_{n+1}$. The count at $t_n$ passes 1 forward every millisecond to $t_{n+1}$ via the transfer store while the count at $t_{n+1}$ passes 1 forward to form a line examining pulse at every 10 milliseconds. The next table shows the programme for $t_{n+2}$.

| Line Condition | Permanent Store Address | Programme | |
|---|---|---|---|
| 0 (loop) | 00 ba | ba | |
| 0 | 01 ba | ba | —A |
| 1 (open) | 10 ba | ba | |
| 1 | 11 ba | bb | |
| 0 | 00 bb | bb | |
| 0 | 01 bb | bc | 0001 |
| 1 | 10 bb | bb | |
| 1 | 11 bb | bb | |
| 0 | 00 bc | bc | |
| 0 | 01 bc | bc | |
| 1 | 10 bc | bc | |
| 1 | 11 bc | bd | |
| 0 | 00 bd | bd | |
| 0 | 01 bd | be | 0010 |
| 1 | 10 bd | bd | |
| 1 | 11 bd | bd | |
| 0 | 00 bs | bs | |
| 0 | 01 bs | bs | |
| 1 | 10 bs | bs | |
| 1 | 11 bs | bt | |
| 0 | 00 bt | bt | |
| 0 | 01 bt | bt | 1010 |
| 1 | 10 bt | bt | |
| 1 | 11 bt | bt | |

In this case the line is examined at ten millisecond intervals under control of the outputs forwarded to $t_{n+2}$ via the transfer store. This serves to recognise the dial pulses, which are asynchronous with the time positions, and also to count them. The partial addresses included in the programme and extracted from the permanent store only alter during the first examination of the line following the examination of the line on which a make or a break is detected, provided that a 10 millisec. interval pulse is then present. Hence shorter makes or breaks than 10 millisecs. are ineffective. The number of pulses received is sent to the block output within 10 millisecs. of the end of a break.

At each stage in the above table it will be noted that all possibilities are covered, i.e. all possible instructions are shown although only one is used in any cycle. Thus with the partial address $bb$ from permanent store there can be any one of 00, 01, 10 and 11, which have the following significances:

00=Line looped, and looped on preceding sampling.
01=Line looped and not looped on proceding sampling.
01=Line looped and not looped on preceding sampling.
11=Line not looped and not looped on preceding sampling.

In the case of the first impulse, the complete address 01 $bb$ not only causes the instruction 0001 to the function block but also causes partial address $bc$ which steps the equipment into the second impulse. Hence there are the same possibilities with $bc$. Similar considerations apply for all subsequent impulses except the tenth, and so stepping continues until either 10 impulses are in, or until the end of an inter-digital pause causes a reset to $ba$, indicated by A.

The next table shows operations in $t_{n+3}$.

| Line Condition | Permanent Store Address | Programme |
|---|---|---|
| 0 | 00 ca | ca |
| 0 | 01 ca | cb |
| 1 | 10 ca | ca |
| 1 | 11 ca | ca |
| 0 | 00 cb | cb |
| 0 | 01 cb | cc |
| 1 | 10 cb | cb |
| 1 | 11 cb | ca |
| 0 | 00 cc | cc |
| 0 | 01 cc | cd |
| 1 | 10 cc | cc |
| 1 | 11 cc | ca |
| 0 | 00 cm | cm |
| 0 | 01 cm | baca 1* |
| 1 | 10 cm | cm |
| 1 | 11 cm | ca |

In this sequence the samplings during $t_{n+3}$ are used, under the control of the 10 millisecond pulses, to count 10 millisecond periods during which the line is looped, the sequence being returned to zero when a break occurs. If the count indicates an interdigital pause, the dial pulse counter in $t_{n+3}$ is reset by modifying the partial address.

This programme requires 43 words of permanently stored information. The programme to actually store the dialled pulses, e.g. in a register, would be slightly more complex than that given above.

Dialled directory numbers can be translated into equipment numbers, or into suitable selection information by applying the directory number to the permanent store access switch and reading the translation from the permanent store output.

*Example 3.—Telegraph signal regenerator*

A telegraph regenerator receives signals with varying degrees of distortion and retransmits them in an undistorted condition. This is normally achieved by generating a series of timing pulses commencing with the start element of each received character. These pulses mark off intervals of 10, 30, 50, 70, 90, 110 and 130 milliseconds from the start and when taken with the input signal are used to re-create the character with a new timing characteristic. At 10 milliseconds, if the line is in mark, no signal is retransmitted because the start signal was clearly less than 10 milliseconds, and is hence assumed to be false. If the line is at space at 10 milliseconds, however, a short space is initiated at the output. At 30, 50, 70, 90 and 110 milliseconds the line is examined and a new element (mark or space) initiated according to the line condition. At 130 milliseconds a mark is initiated at the output whatever the line condition.

The function uses a programme which requires three time positions of which the first two is a time scale to produce the 10 millisecond examining pulses.

These two form a counter similar to what has already been mentioned which is started at a space on the line and continues to count time position intervals until stopped by a signal from the programme in $t_{n+2}$.

The latter time position creates the 10, 30, 50 . . . intervals from the 10 millisecond input and transmits either a mark or space (1 or 0) at appropriate intervals to accord with the input. Finally at 140 milliseconds the partial addresses in all three time slots are reset to their original condition, unless the receiving starting space was short when an earlier restoration occurs. The next table shows the $t_{n+2}$ programme, in which at each stage all possible operations are indicated, but it will be obvious that at any one stage only the operation called for by the inputs occurs.

| Line Condition | Permanent Store Address | Programme |
|---|---|---|
| M | 00 da | da |
| S | 10 da | da |
| M | 01 da | dkda (A) |
| S | 11 da | db1 (A) |
| M | 00 db | db |
| S | 10 db | db |
| M | 01 db | dc |
| S | 11 db | dc |
| M | 00 dc | dc |
| S | 10 dc | dc |
| M | 01 dc | dd0(B) |
| S | 11 dc | dd1(B) |
| M | 00 dd | dd |
| S | 10 dd | dd |
| M | 01 dd | de |
| S | 11 dd | de |
| M | 00 de | de |
| S | 10 de | de |
| M | 01 de | df0(C) |
| S | 11 de | df1(C) |
| ↓ | ↓ | ↓ |
| M | 01 dk | dp0(D) |
| S | 11 dk | dp1(D) |
| M | 00 dp | dp |
| S | 10 dp | dp |
| M | 01 dl | dm |
| S | 11 dl | dm |
| M | 00 dm | dm |
| S | 10 dm | dm |
| M | 01 dm | dn0(E) |
| S | 11 dm | dn0(E) |
| M | 00 dn | dn |
| S | 10 dn | dn |
| M | 01 dn | dkda (F) |
| S | 11 dn | dadk (F) |

NOTE A.—Examination of line at 10 milliseconds. If at mark, the time scale is reset (short start rejection), if in space a binary 1 is sent.
NOTE B.—Examination of line at 30 milliseconds. If in mark a binary 0 is sent, if in space a binary 1.
NOTE C.—Examination of line at 50 milliseconds, result as in B.
NOTE D.—Examination of line at 110 milliseconds for last permutable element.
NOTE E.—At 130 milliseconds a mark or stop is sent, whatever the line condition.
NOTE F.—At 140 milliseconds the time scale is reset, and the regenerator is ready for the next character.

This programme takes 34 words of permanent storage. As before it is only slightly more complicated to store the received character. Once stored they can be changed by applying them as an address to the access selection into any required form, for example, into seven-unit error checking code.

*Example 4.—Telegraph decoder*

This illustrates a form of translation. A problem which frequently occurs in telegraphy is to recognise particular sequences of character. For the purpose of explanation the following nine sequences are postulated, characters being dealt with one at a time.

AAA    BAA    ABA
    AAB    BAB    ABB
    AAC    BAC    ABC The programme for recognizing these sequences is shown in the next table, and uses the elimination method.

| Input | Permanent Store Address | Programme | |
|---|---|---|---|
| | | Next Address | Instruction |
| | First Code Digit | | |
| A | Aa | b | 000111000 |
| B | Ba | b | 111000111 |
| C | Ca | b | 111111111 |
| D-Z | D-Za | b | 111111111 |
| | Second Code Digit | | |
| A | Ab | c | 000000111 |
| B | Bb | c | 111111000 |
| C | Cb | c | 111111111 |
| D-Z | D-Zb | c | 111111111 |
| | Third Code Digit | | |
| A | Ac | a | 0110110111 |
| B | Bc | a | 1011011011 |
| C | Cc | a | 1101101101 |
| D-Z | D-Zc | a | 1111111111 |

It is assumed that the permanent store has nine columns associated with these instructions, numbered 1 to 9, each associated with a trigger initially in its 0 condition. To explain the operation it is assumed that BAC is being received. The reception of the first digit B causes the store to be addressed Ba, which causes outputs (1's) on columns 1, 2, 3, 7, 8 and 9 to set the triggers associated therewith to the state 1. The second character is A, so the store is addressed Ab and in this case outputs occur on columns 7, 8 and 9 which do not affect the triggers since triggers 7, 8, 9 are already operated. The final address on reception of the third character is Cc which causes trigger 4 and 5 to be set to 1, so that only 6, which corresponds to BAC is at 0, thus indicating that BAC has been received.

This programme uses, in effect, 12 words of permanent storage.

Although the programmes described above are relatively simple, certain advantages may be noted. These are:

(a) The design of the logic for use in a switching or other electronic system is simplified as compared with conventional techniques when the present invention is used.

(b) Production is facilitated since different systems do not differ from each other to the same extent as do conventional systems.

(c) The major parts in the operation played by the common stores tend to a reduction in the amount of equipment required as compared with conventional systems.

(d) Reliability of a system using the present invention is better than that of a conventional system because faults can be readily detected and/or corrected by the use of automatic error detection and correction techniques in conjunction with the stored programmes. Thus operations can be checked by the use of redundancy, and "diagnosing" routines may be used. For example each partial address in the temporary store may be accompanied by a check number, and the application of this address can then result in not only a new partial address being read from the permanent store, but also two new check numbers. One of these new check numbers is then checked against the current stored check number, and the other used to accompany the newly-read partial address. In the event of a failure a spare permanent store is switched in and the address at which the faulty word occurred displayed. As a further example, instructions can be repeated back from the function block and compared with those originally transmitted. In the event of a failure to compare, a diagnostic programme could be brought into play to test each connection in turn until a faulty connection is found. A check programme can be selected instead of the normal programme by applying the result of the comparison to the permanent store access switch.

It will be noted that the programmes discussed above are relatively short, and this indicates that a large capacity permanent store may not be essential. An alternative possibility is to use several small (e.g. 1000 words) stores.

While the principles of the invention have been described above in connection with specific embodiments, and particular modifications thereof, it is to be clearly understood that this description is made only by way of example and not as a limitation on the scope of the invention.

What I claim is:

1. An electrical system for performing a sequence of related switching operations comprising a main store of information items each of which corresponds to a predetermined logical switching function of its address location within the said store, means coupled to said main store for selecting said items, an auxiliary store directly coupled to said main store and said selecting means for temporarily storing a portion of the last item selected by said selecting means, a source of information signals, and means coupled to said source and said auxiliary store for conditioning said selecting means to subsequently select an item from said main store at an address location therein corresponding to a combination of signal conditions manifested by said source and said auxiliary store.

2. An electrical system for performing a sequence of related switching operations comprising a main store having groups of information items stored therein, each said item bearing a predetermined relation as intelligence, to its location within said main store, means coupled to said main store for selecting individual items stored therein, an auxiliary store directly coupled to said main store and said selecting means for temporarily storing a predetermined portion of each said selected item, a source of variable information signals, and means coupled to said source and said auxiliary store for operating said selecting means to select an item from said main store at an address corresponding to the combined signal outputs of said source and said auxiliary store.

3. An electrical system for the control of inter-related electrical operations comprising a main store of information items, each of which corresponds to a logical switching function of its address location within the said store, a plurality of functional blocks which are required to simulate logical switching functions of inputs applied thereto, an auxiliary store coupled to said main store and having a plurality of sections individually allocated to said plurality of blocks, selecting means coupled to said main store, said auxiliary store, and said blocks for sequentially coupling the said blocks in combination with the corresponding allocated sections of said auxiliary store to addresses in said main store corresponding to signal conditions manifested in combination by said blocks and corresponding sections, means responsive to said selecting means for reading out the information items stored at the said coupled addresses in said main store, means for applying a first part of each said read-out information item as an output to the said functional block; and means for temporarily storing a signal corresponding to a second part of each said read-out information item in the said corresponding allocated section of said auxiliary store.

4. A system according to claim 3 wherein said selecting means includes timing means for providing a recurrent series of time pulses successively designating time positions allocated to different ones of said functional blocks, and means associated with each said functional block and said allocated section of said auxiliary store, and responsive to said time pulse allocated to said block, for transferring signal combinations representative of said current input condition of said block and said stored second address part.

5. A system according to claim 3 wherein each said selected address includes, in addition to said first and second address parts, at least one other address part derived from other information signals relating to the electrical operations in progress.

6. A system according to claim 4 wherein a plurality of said time positions are allocated to a single one of said blocks, and an auxiliary transfer store is provided in association with each additional time position allocated to a block for storing a corresponding additional address part for controlling each said subsequent address selection.

References Cited by the Examiner

UNITED STATES PATENTS

| | | | |
|---|---|---|---|
| 2,271,990 | 10/55 | McNaney | 340—172.5 |
| 2,764,750 | 9/56 | Wright | 340—172.5 |
| 3,069,658 | 12/62 | Kramskoy | 340—172.5 |
| 3,070,304 | 12/62 | Amdahl et al. | 340—172.5 |

OTHER REFERENCES

IBM Customer Engineering Manual of Instruction—650 Data Processing System, copyright 1956 and 1957 by International Business Corp. (15 pages), publication I.

Pages 2–58 and 2–136, 1959, Handbook of Automation Computation and Control, by Grabble Ramo and Woodridge, publication II.

ROBERT C. BAILEY, *Primary Examiner.*

EVERETT R. REYNOLDS, MALCOLM A. MORRISON, *Examiners.*